G. O. SEWARD & F. VON KÜGELGEN.
PRODUCTION OF SILICON.
APPLICATION FILED MAY 14, 1907.
916,793.  Patented Mar. 30, 1909.
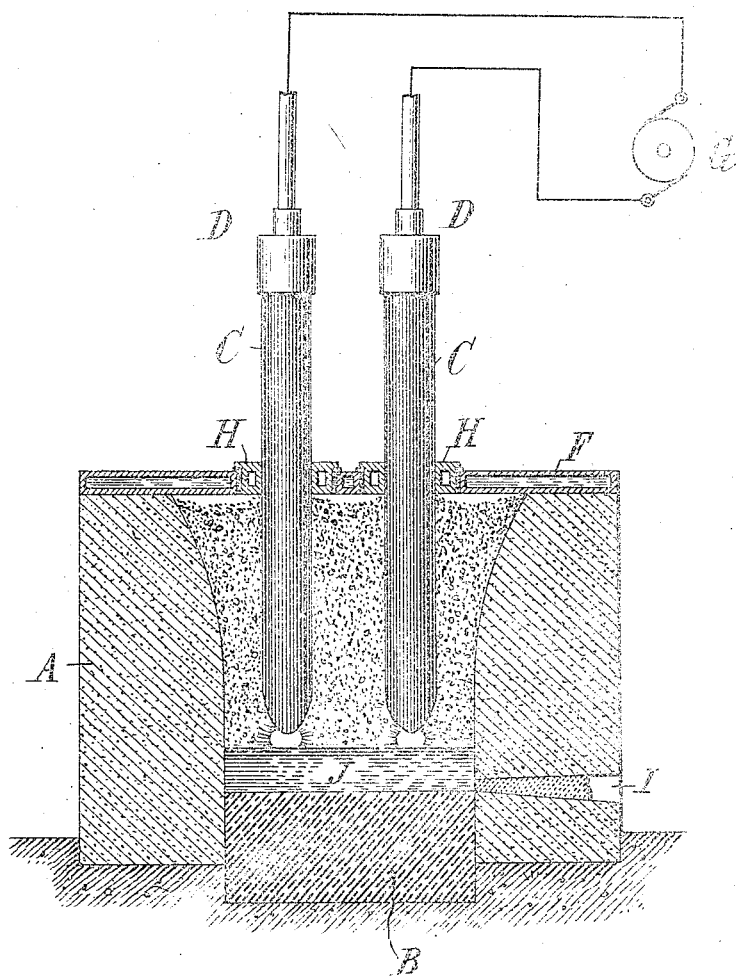
WITNESSES:
Fred White
René Bruine
INVENTORS:
George O. Seward
Franz von Kügelgen,
By Attorneys,

UNITED STATES PATENT OFFICE.

GEORGE O. SEWARD, OF EAST ORANGE, NEW JERSEY, AND FRANZ VON KÜGELGEN, OF HOLCOMBS ROCK, VIRGINIA, ASSIGNORS TO VIRGINIA LABORATORY COMPANY, OF NEW YORK, N. Y., A CORPORATION OF NEW YORK.

PRODUCTION OF SILICON.

No. 918,793.

Specification of Letters Patent.

Patented March 30, 1909.

Application filed May 14, 1907. Serial No. 373,629.

*To all whom it may concern:*

Be it known that we, GEORGE O. SEWARD, a citizen of the United States, residing in East Orange, in the county of Essex and State of New Jersey, and FRANZ VON KÜGELGEN, a subject of the German Emperor, residing in Holcombs Rock, in the county of Bedford and State of Virginia, have jointly invented certain new and useful Improvements in the Production of Silicon, of which the following is a specification.

Moissan (*Le Four Electrique*) heated by an electric arc a mixture of rock crystal and powdered carbon in a carbon cylinder and obtained a mixture of silicon and siliconcarbid, the latter predominating. Moissan stated that by cooling the silicon vapor at the moment of its production, this process might be applied to the preparation of silicon . . ., but suggested no way of accomplishing this result. Bernard Scheid has proposed to add an alkaline silicate to the mixture of silica and carbon in the electric furnace and to absorb the silicon produced, at the moment of its formation, by the melted silicate so that it is protected from volatilization, his idea being that the "silicon vapor as it is evolved gets outside the range of the electrode or the luminous arc and is condensed and taken up by the liquid melted silicate surrounding it." (U. S. Patent No. 662,548.) Tone uses lime or fluorspar as the flux to form a molten silicate, which he uses as a "resistance conductor", laying stress upon the idea that the electric arc is unsuitable for producing silicon. (U. S. Pat. No. 842,273). Tone has also proposed to produce metallic silicon by heating silica and carbon in an incandescent electric furnace "keeping the temperature below the limits at which volatilization occurs." (U. S. Patent No. 745,122).

We have found that the use of fluxes in the smelting of a mixture of silica and carbon is undesirable and tends to defeat the object sought, probably because it lowers the melting point of the contents of the furnace and, partly at least, substitutes the fluid resistance of the silicate for the gaseous resistance of the ordinary arc.

We consider that the high temperature of the gaseous electric arc can better be utilized for the production of silicon than a fluid resistance or a partly fluid partly gaseous resistance, and therefore dispense entirely with the use of fluxes (in fact carefully avoiding them) and prevent the loss of silicon by volatilization in quite a different manner.

We use a silicon compound, preferably a substantially pure silica and a carbonaceous reducing agent, preferably pure coke, and subject a mixture thereof to the heat of a powerful electric arc. If carbon is used as reducing agent, the reaction is

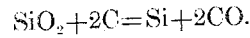
$$SiO_2 + 2C = Si + 2CO.$$

If silicon carbid is used as reducing agent, the reaction is

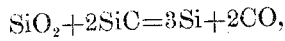
$$SiO_2 + 2SiC = 3Si + 2CO,$$

in which latter reaction it is probable that the SiC is first decomposed and the carbon (in the form of graphite) then reduces the $SiO_2$.

In practicing our invention we preferably use a double-pole arc furnace with substantially vertical carbon electrodes.

The accompanying drawing is a vertical section of a suitable construction of furnace.

Referring to the drawing, let A represent the body or crucible of the furnace which is made of or lined with silica sand.

B is the hearth which may be made of carbon.

C C are the electrodes, being parallel upright pencils of carbon or graphite which are carried in suitable holders D D which are connected with the opposite terminals of a dynamo or other generator G.

F is the furnace top which is shown as of the water-cooled type, and H H are water-cooled insulated bushings through which the pencils pass.

I is a tap hole.

Within the furnace is shown a molten bath J of reduced silicon, and above this and surrounding the pencils is the powdered mixture of silicon and carbon.

We prefer to use an arc of high amperage and low voltage, an arc of 15,000 amperes at 30 volts being safely maintained by an electrode of about four square feet cross section.

We feed into such a furnace a coarsely ground mixture of flint rock and carbon, preferably merely crushing the flint rock to about 1 inch mesh size and grinding the coke so that it shall pass a 10 mesh screen. Such a mixture is very porous and assists in obtaining the conditions we shall presently describe. The mixture is kept preferably piled about eighteen inches above the lower end of the electrode, so that the arc is maintained in the midst of the mass of porous mixture. We prefer to start with a charge made up of about 75 parts by weight of flint rock to 25 of coke, so as to introduce a surplus of silica, afterward changing this to 70 parts of flint rock to 30 of coke. It will be observed that there is no excess of carbon, or barely enough to maintain a reducing atmosphere around the incandescent zone of the arc. The temperature maintained under these conditions is above that at which silicon carbid remains stable so that, even if this material is formed in part, it is immediately decomposed. The silicon is reduced in the form of vapor and expands into the interstices of the porous mixture, where it condenses. These interstices being full of a reducing gas, namely CO, allow the silicon to condense without being oxidized. The reduced silicon percolates down through the porous mass and collects at the bottom of the crucible. It is tapped out into carbon molds from time to time. We, therefore, in practicing this invention, maintain a reduction zone at a temperature so high that silicon carbid cannot form or, if formed in part, is decomposed; around this zone of reduction we maintain a cooler porous condensing zone, the interstices of which we keep filled with a reducing atmosphere which prevents the vapor of silicon from oxidizing before it can condense. The importance of this reducing atmosphere in the interstices of the porous condensing zone is strongly shown when the escaping reduction gases blow a hole in the mixture and allow some air to enter. Immediately the silicon vapor oxidizes and spurts out of the hole in dense clouds of amorphous silica. The molten silicon may be tapped out into the open air, the temperature being too low to cause it to re-oxidize.

Our process is subject to some variation in the character of the raw materials used, in the proportions of the ingredients, in the type of furnace, and in the method of procedure, keeping however within the essential conditions herein set forth.

We claim as our invention:—

1. The process of producing silicon by subjecting a suitable silicon compound and a reducing agent to sufficient heat to reduce said compound and volatilize the silicon, while maintaining around or above the zone of reduction a cooler zone containing a non-oxidizing atmosphere in which the volatilized silicon is condensed.

2. The process of producing silicon by subjecting silica and a carbonaceous reducing agent to sufficient heat to reduce said compound and volatilize the silicon, while maintaining around or above the zone of reduction a cooler zone containing a non-oxidizing atmosphere in which the silicon vapor is condensed.

3. The process of producing silicon by subjecting a suitable silicon compound and a carbonaceous reducing agent in an electric furnace to a temperature above that at which silicon carbid remains stable, thereby reducing the silicon compound and forming silicon vapor, while maintaining around or above the zone of reduction a cooler zone containing a non-oxidizing atmosphere in which the silicon vapor is condensed.

4. The process of producing silicon by subjecting a porous mixture of silica and carbon to the heat of an electric arc, whereby said mixture is reduced and the silicon is volatilized, while maintaining the arc deeply buried under such mixture, whereby a cooler zone is maintained around the zone of reduction in which the silicon vapor is condensed.

In witness whereof, we have hereunto signed our names in the presence of two subscribing witnesses.

GEORGE O. SEWARD.
FRANZ VON KÜGELGEN.

Witnesses:
F. VON BIDLER,
HARRY RILEY LEE.